March 12, 1957     K. L. SAYRE     2,785,085
TREATMENT OF POLYETHYLENE TEREPHTHALATE
Filed Oct. 1, 1953
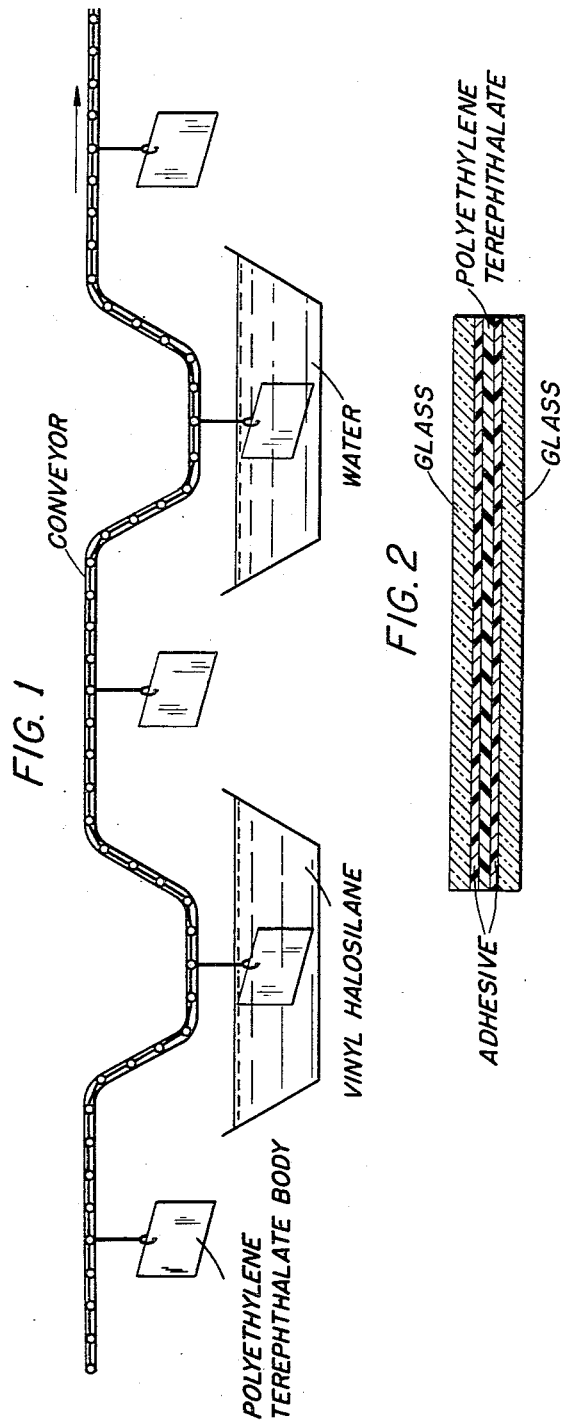
INVENTOR.
KENNETH L. SAYRE
BY
Attorney

2,785,085

TREATMENT OF POLYETHYLENE TEREPHTHALATE

Kenneth L. Sayre, Lorain, Ohio, assignor to Bjorksten Research Laboratories, Inc., Madison, Wis., a corporation of Illinois Application October 1, 1953, Serial No. 383,603

3 Claims. (Cl. 117—62)

This invention relates to polyethylene terephthalate treated to improve its bond to certain adhesives and to a method of treating polyethylene terephthalate.

An object of this invention is to provide polyethylene terephthalate having a surface adapted to be more adherent to epoxy resins and to a method of treating polyethylene terephthalate to improve its adherency to adhesives.

Further objects will become apparent from the drawing and the following detailed description in which it is my intention to illustrate the invention without thereby intending to limit its scope to less than that of all equivalents which will be apparent to those skilled in the art.

Figure 1 is a diagrammatic view of the process. Figure 2 is a cross-sectional view of a safety glass or glass laminate adapted to resist shattering when broken by an impinging object. Two glass plates and an interlayer of polyethylene terephthalate are secured together with an adhesive which may consist of an epoxy resin or may comprise an epoxy resin in its composition. The particular adhesive is not a critical feature of the invention. Other adhesives may be utilized such as room-setting and high-temperature curing polyesters and compositions containing methacrylic acid or acrylic acid or the lower aliphatic esters of these acids such as polymethyl methacrylate.

In accordance with the invention, a sheet of polyethylene terephthalate, sold commercially as "Mylar," is treated with vinyl trichloro silane and is then washed in water. The film thus treated is then utilized as an interlayer in a laminate of the above described construction.

*Example*

A sheet of polyethylene terephthalate .007 inch thick was immersed 10 seconds in a 2% solution of vinyl trichloro silane in xylene. The film was then air-dried, washed in water and then dried again. This film was then coated on each side with a catalyzed epoxy resin and pressed between two glass plates at 320° F. for ½ hour.

The resulting laminate was tested by heating at 400° F. for two hours and then dropping a pointed hammer on it while maintaining a pressure differential of six pounds per square inch across the laminated panel. The results were compared with a control sample prepared and tested in the same way but without the silane treatment of the polyethylene terephthalate. The control sample shattered with considerable delamination while the sample treated as described above exhibited only negligible delamination.

Other vinyl silane compounds which may suitably be used for the invention in place of vinyl trichloro silane include: divinyl dichlorosilane, vinylhalosilane, and the like.

The vinyl trichlorosilane, or one of the other compounds mentioned as suitable for use in place thereof, may be applied in solution as described in the example or may also be applied in the vapor phase simply by exposing a sheet of polyethylene terephthalate to the vapors of the silane.

Polyethylene may be treated in the described manner for use in making a glass laminate having an interlayer of polyethylene terephthalate and also for use in preparing a surface of a polyethylene terephthalate sheet to receive a surface coating, preparation of polyethylene terephthalate for joining by cementing and preparation of polyethylene terephthalate for bonding to plastics or ceramics as in the manufacture of capacitors.

It is thus apparent that my invention is broad in scope and is not to be limited excepting by the claims.

Having thus disclosed my invention, I claim:

1. The process of improving the adhesivity of a surface of a body of polyethylene terephthalate for synthetic resins comprising treating said surface with a hydrolyzable vinyl silane compound and subsequently treating said surface with water.

2. The process of improving the adhesivity of a surface of a body of polyethylene terephthalate for synthetic resins comprising treating said surface with vinyl halosilane and subsequently treating said surface with water.

3. The process of improving the adhesivity of a surface of a sheet of polyethylene terephthalate for synthetic resins comprising treating said surface with vinyl trichlorosilane and subsequently treating said surface with water.

References Cited in the file of this patent

UNITED STATES PATENTS

| | | |
|---|---|---|
| 1,867,787 | Watkins | July 19, 1932 |
| 2,436,304 | Johannson | Feb. 17, 1948 |
| 2,601,337 | Smith-Johannsen | June 24, 1952 |
| 2,649,396 | Witt et al. | Aug. 18, 1953 |